United States Patent [19]
Bevilacqua

[11] 3,849,257
[45] Nov. 19, 1974

[54] GUIDE STRUCTURE FOR CONTROL ELEMENTS

[75] Inventor: Frank Bevilacqua, Windsor, Conn.

[73] Assignee: Combustion Engineering Inc., Windsor, Conn.

[22] Filed: June 28, 1972

[21] Appl. No.: 266,858

[52] U.S. Cl............ 176/36 R, 176/36 S, 176/86 R, 176/87, 285/20
[51] Int. Cl.............................................. G21c 7/08
[58] Field of Search............176/36, 86, 50, 87, 61, 176/64; 285/19, 20

[56] References Cited
UNITED STATES PATENTS

| | | | |
|---|---|---|---|
| 2,508,655 | 5/1950 | Silverman | 285/19 |
| 3,178,356 | 4/1965 | Wheelock | 176/50 |
| 3,212,979 | 10/1965 | Silverblatt | 176/36 |
| 3,346,459 | 10/1967 | Prince et al. | 176/36 |
| 3,361,639 | 1/1968 | Ashcroft et al. | 176/86 |
| 3,481,832 | 12/1969 | Rickert | 176/86 |
| 3,595,748 | 7/1971 | Frisch et al. | 176/36 |
| 3,604,746 | 9/1971 | Notari | 176/36 |
| 3,607,629 | 9/1971 | Frisch et al. | 176/36 |
| 3,625,816 | 12/1971 | Aleite et al. | 176/36 |

FOREIGN PATENTS OR APPLICATIONS

| | | | |
|---|---|---|---|
| 552,899 | 4/1943 | Great Britain | 285/20 |

*Primary Examiner*—Harvey E. Behrend
*Attorney, Agent, or Firm*—John R. Nelson

[57] ABSTRACT

A guide structure for aligning fuel assemblies forming a nuclear core of a nuclear reactor and for guiding a plurality of control elements for telescoping movement within guide channels of fuel assemblies. Two spaced tube sheets, rigidly connected by a plurality of hollow tubes extending therebetween, are supported by a support means relative to the nuclear core with each of the hollow tubes being in alignment with a guide channel of the fuel assemblies. A plurality of yoke means, each of which interconnects at least two of a plurality of control elements situated within some of the hollow tubes, are provided whereby the interconnected control elments telescopingly move as a unit within the guide channels.

13 Claims, 11 Drawing Figures

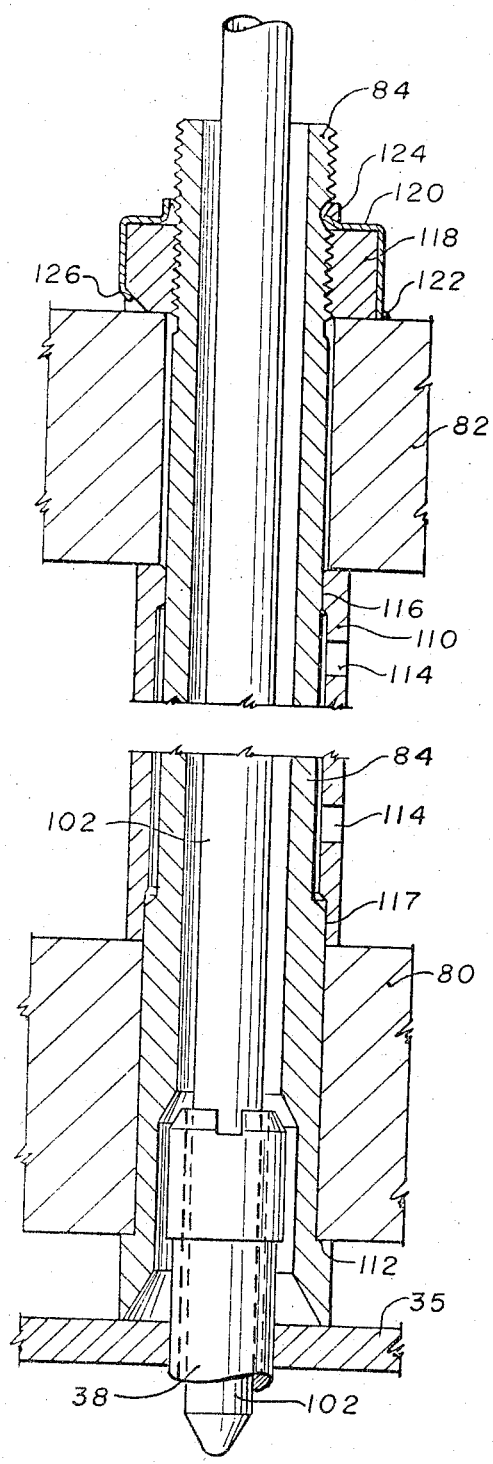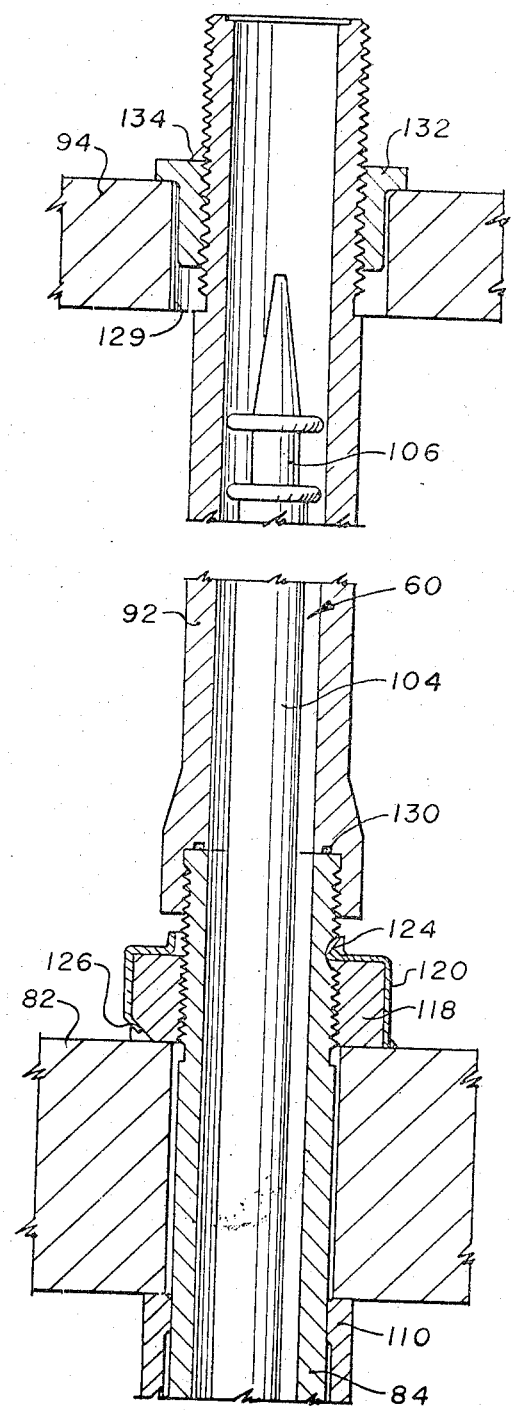
FIG. 3
FIG. 6

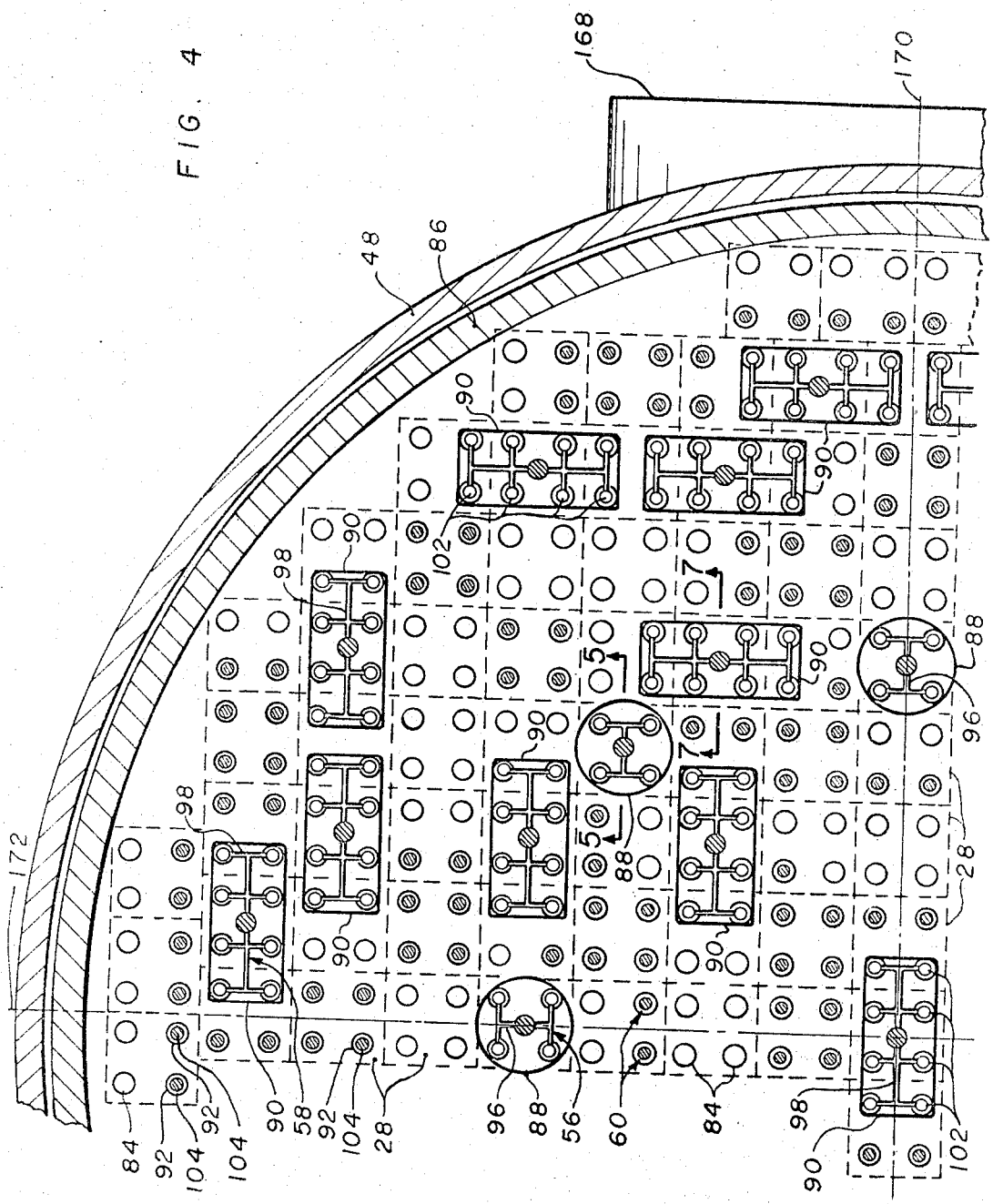

GUIDE STRUCTURE FOR CONTROL ELEMENTS

BACKGROUND OF THE INVENTION

This invention relates to nuclear reactors and more particularly to a guide structure for aligning fuel assemblies of a nuclear reactor and for guiding a plurality of control elements for telescoping movement within guide channels of fuel assemblies.

In a nuclear reactor, control elements are provided for insertion into the core or fuel region of the reactor to control and regulate its reactivity and power level. These control elements contain materials known as poisons for absorbing neutrons thereby lowering the local neutron flux. Typically, in a pressurized water reactor the control elements, in being withdrawn and inserted, pass through the outlet region of the reactor in which reactor coolant exiting from the core must be turned to pass through the outlet nozzles in the side of the reactor vessel. This is necessarily a high cross-flow region due to the high flow rates of the reactor coolant passing through the outlet region and out through the relatively small flow area of the outlet nozzles. Accordingly, if the control elements were not protected in this outlet region, the high flow might cause vibration of the control elements causing them to wear and possibly fail. In addition, the high lateral loads might cause bowing of the control elements or might result in high frictional loads of the control elements in their guides, thereby preventing rapid insertion of these control elements in the event of an emergency calling for a reactor shutdown.

In the prior art, the control elements have been grouped or ganged together inside the vessel and driven as a unit by a drive mechanism positioned outside of the vessel. This grouping is necessary due to the conflicting requirements of providing enough control elements in order to maintain effective control and of allowing a limited number of vessel penetrations in order to maintain the structural integrity of the vessel. For such systems, protection from the high lateral loads has normally been provided by a plurality of shrouds which surround the control elements of a ganged set in the outlet region. Heretofore, such designs have been expensive and have limited the flexibility of controlling the reactor by limiting the geometric arrangement of the control elements. The shrouds necessarily have been massive and of a high manufactured quality, and therefore expensive, in order to withstand the high lateral loads. Furthermore, an increase in the number of control elements, such as grouping more control elements together would result in larger shrouds which in turn would increase the hydraulic loads due to a decrease in the flow area in the outlet region. This in turn would result in making the shrouds even more expensive and massive. Further still, due to the long manufacturing time and the great number of components involved, the specific control pattern for reactor must be chosen at an early date long before actual operation of the reactor. Accordingly, it is difficult to change the specific control pattern after manufacturing of the reactor has begun.

SUMMARY OF THE INVENTION

The present invention overcomes the above previously discussed and other disadvantages of the prior art by providing a novel guide structure for the control elements. There is provided a reactor vessel having a nuclear core formed from a plurality of fuel assemblies, each of which has a plurality of longitudinally extending fuel elements and at least one guide channel extending longitudinally thereof. The guide structure comprises two spaced tube sheets and a plurality of hollow tubes extending between and rigidly connected thereto. A support means supports the two spaced tube sheets relative to the nuclear core with each of the hollow tubes being in alignment with one of the guide channels of the fuel assemblies. A plurality of control elements are situated in some of the hollow tubes for telescoping movement within the guide channels in alignment therewith. A plurality of yoke means are provided, each of which interconnects at least two of the plurality of control elements such that the interconnected control elements will telescopingly move as a unit.

As is apparent from the preceding description, the hollow tubes between the two tube sheets can more easily be designed to withstand the hydraulic loadings thereon since each tube has a smaller area subject to the loads than the previous massive shrouds. Furthermore, by initially providing extra hollow tubes in alignment with the guide channels of the fuel assemblies the number of control elements providing control of the reactor can be readily increased by simply interconnecting together more control elements which are then driven as a unit by a drive mechanism positioned outside of the reactor vessel. Further still, by standardizing the guide structure to provide extra tubes initially, the control pattern of the control elements can be determined after the manufacturing has been completed.

BRIEF DESCRIPTION OF THE DRAWINGS

FIG. 3 is a vertical cross sectional view illustrating a means of connecting the two tube sheets of the guide structure of FIG. 2;

FIG. 4 is a cross sectional view taken along lines 4—4 of FIG. 2 illustrating a representative control pattern of a nuclear reactor;

FIG. 6 is a vertical cross sectional view of a fine grain control element shroud employed in the guide structure of FIG. 2;

DESCRIPTION OF THE PREFERRED EMBODIMENT

Figure 1:
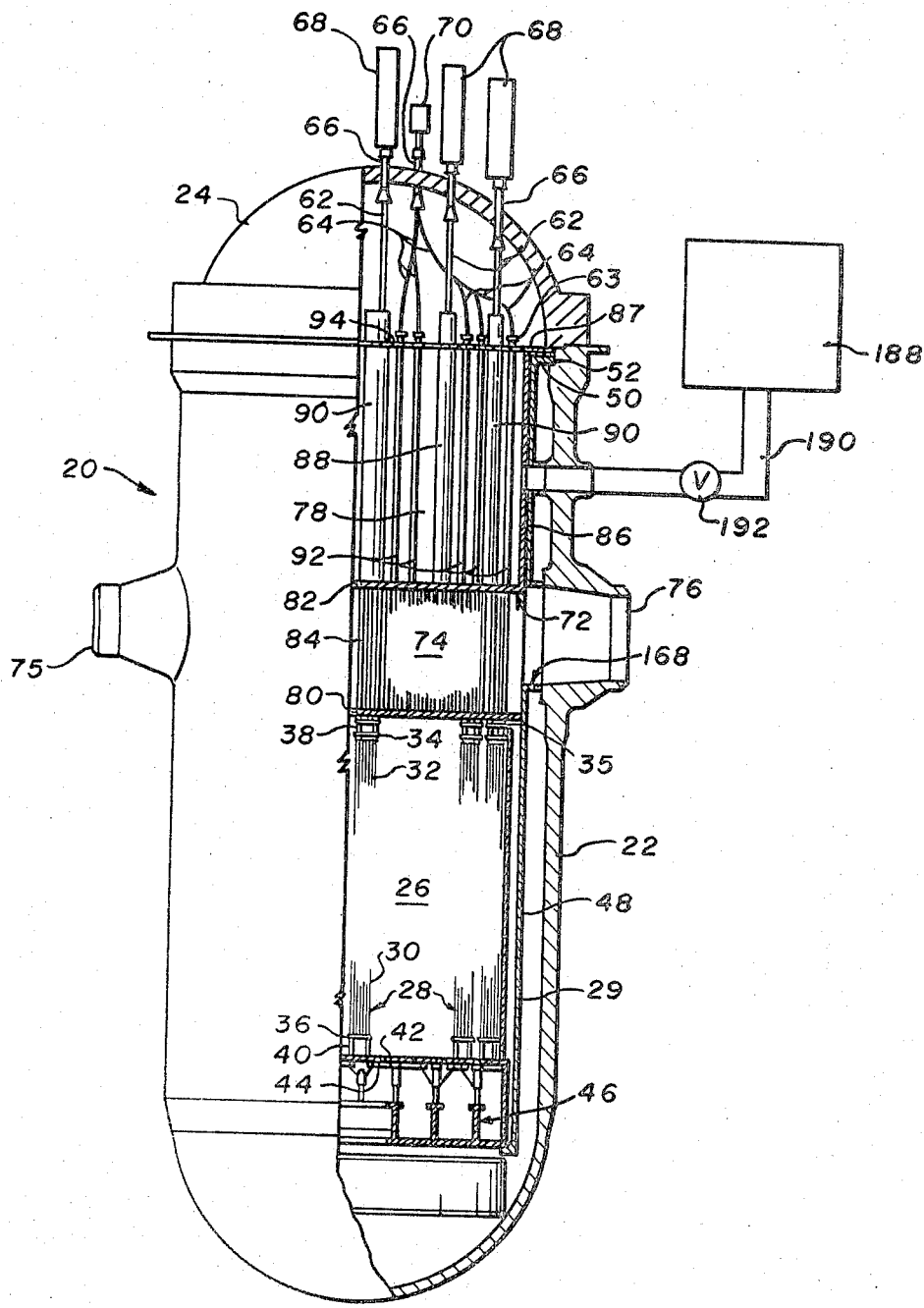
FIG. 1 is an elevation view partially in section illustrating a nuclear reactor embodying the present invention.

Referring now to FIG. 1, there is shown a nuclear reactor 20 including a reactor vessel 22 having therewithin a core or fuel region 26. The fuel region 26 is comprised of and defined by a plurality of fuel assemblies 28. These fuel assemblies 28 are supported in position by the lower support plate 42 which has apertures 44 therein for admitting coolant to the reactor core 26. Surrounding the core and also affixed to the lower support plate 42 is the core shroud 29. The lower support plate 42 and the entire core assembly is supported by a lower support assembly 46 which in turn is supported by the core barrel 48. The core barrel 48 hangs from the lip 52 on the reactor vessel 22 by means of flanged ends 50.

The fuel assemblies 28 are of the type generally described in U.S. Pat. No. 3,481,832 entitled, "Nuclear Reactor Core and Control Element Arrangement" by Royce J. Rickert. Briefly each fuel assembly 28 includes a plurality of longitudinally extending fuel elements 30 and a plurality of hollow guide tubes 32 interspersed between and within the array of fuel elements 30. In the embodiments shown in the Figures, there are four guide tubes 32 provided for each fuel assembly 28 although, as it will be apparent, any number may be utilized. The guide tubes 32 are fixed to upper and lower end plates 34 and 36, respectively, to form the skeletal supporting structure. Hollow alignment posts 38 are in registry with the upper ends of the guide tubes 32 and extend upwardly from the fuel assembly end plate 34 and alignment posts 40 extend downwardly from the lower end plate 36 to engage the lower support plate 42.

Control of the neutron flux within the core region 26 is effected in a well-known manner through the use of control elements which contain or are comprised of a neutron poison. Two basic types of control element assemblies have been depicted in the Figures: primary or shutdown control element assemblies 56, 58 and fine grain or single control element assemblies 60. As best seen in FIGS. 1, 2, 5 and 7, the primary control element assemblies 56, 58 comprise a plurality of individual, high worth control elements 102 interconnected or ganged together so as to move as a unit. Two different primary control element assemblies are illustrated: a four-fingered assembly 56 in which the individual control elements 102 are joined to a four-fingered yoke 96 and an eight-fingered assembly 58 in which the control elements 102 are joined to an eight-fingered yoke 98. The yokes 96, 98 are each connected to a drive rod extension 62 by couplings 100. The drive rod extensions 62 extend through nozzles 66 in the pressure vessel head 24 and are connected to control element drive mechanisms 68 mounted outside of the reactor vessel head 24. The control element drive mechanisms 68 are typically electomagnetic linear motion drive devices which move the control element 102 in incremental steps into and out of the reactor core 26.

Figure 2:
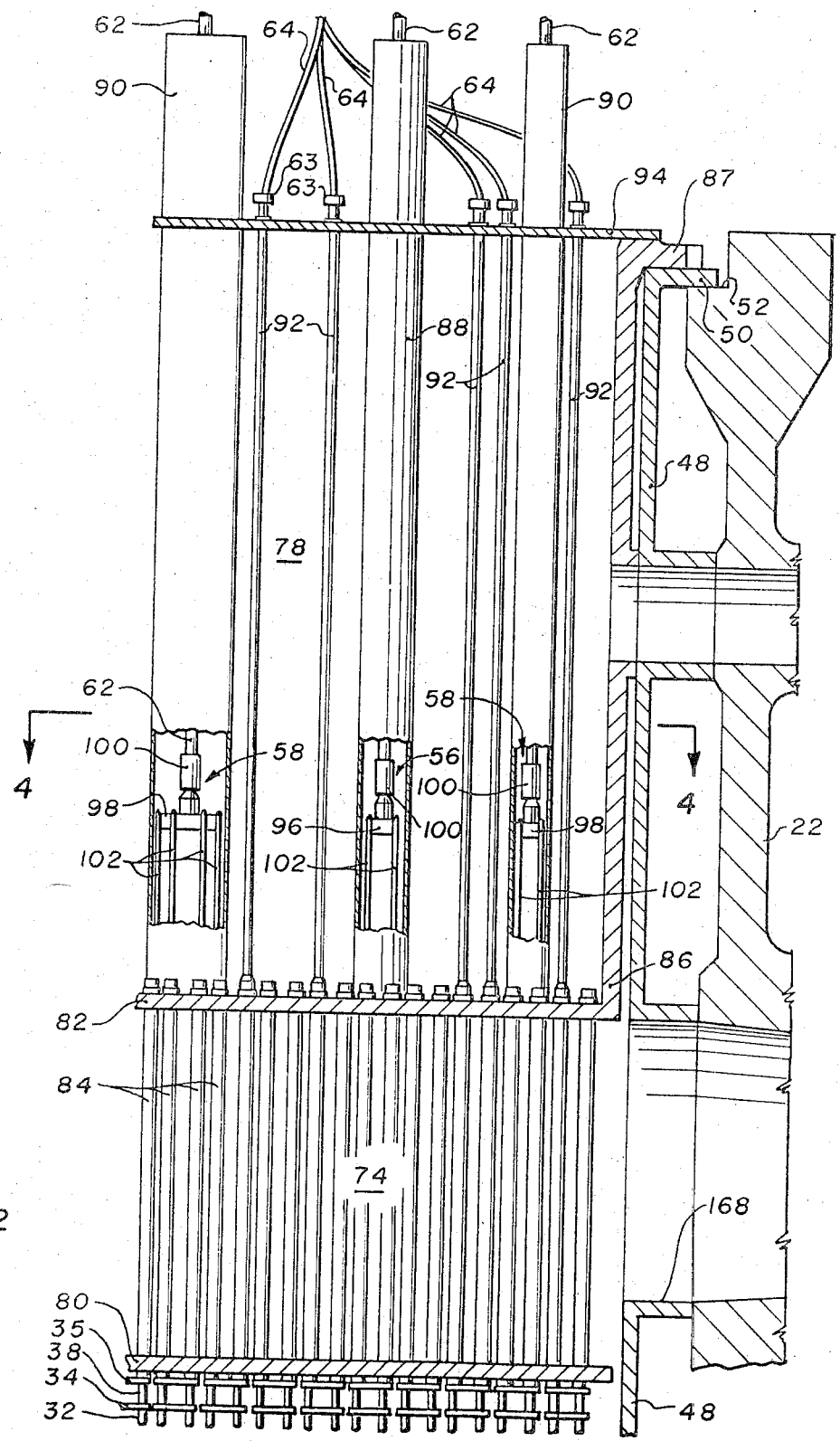
FIG. 2 is an elevation view partially in section of a portion of the nuclear reactor of FIG. 1 illustrating the guide structure for control element assemblies.

The fine grain control element assemblies 60 can best be seen in FIGS. 1, 2, and 6 in which the control elements 104 are of a relatively low neutron absorption worth and are completely and individually enshrouded above the core 26 by shrouds or tubing 92. Piping 64 is coupled to shrouds 92 by coupling 63 and passes through a nozzle 66 in the vessel head 24. Typically, a plurality of piping 64 passes through one nozzle 66 and connects to a hydraulic actuator assembly 70. The hydraulic actuator assembly 70 controls the position of the control elements 104 by exerting a pressure differential across the piston head 106 thereof such that the control elements 104 are either in a fully inserted position or a fully retracted position. Such a system is described in copending application Ser. No. 211,308 entitled, "Top Actuator Reactor Control System" by F. Bevilacqua, et. al. filed Dec. 23, 1971 and is advantageous to produce slight variations in the neutron flux of the reactor core region thereby effecting a finer control of the power distribution.

Located above the core region 26 and spaced slightly therefrom is a guide structure assembly 72 which serves to align the top ends of the fuel assemblies 28 and serves to guide and protect the control elements 102 and 104 which enter from above the core region 26. The guide structure assembly 72 is best seen in FIGS. 1 and 2 and comprises two spaced tube sheets 80 and 82 which are rigidly interconnected to one another by means of a plurality of longitudinally extending hollow tubes 84. The tubes 84 extend slightly above the upper tube sheet 82 and slightly below the lower tube sheet 80. A support barrel 86 is rigidly affixed to the upper tube sheet 82 and supports the two tube sheets within the core barrel by means of a flange 87 formed at its upper end which rests on the core barrel flange 50.

The guide structure 72 divides the interior of the reactor vessel 22 into core region 26, an outlet plenum region 74 and an inactive plenum region 78 by means of the two tube sheets 80, 82. The significance of the outlet and inactive plenum will be discussed hereinbelow. The hollow alignment posts 38 on the upper end plate 34 of the fuel assemblies 28 extend into the lower extensions of the tubes 84. The lower tube sheet 80 serves as a fuel alignment plate to physically locate the fuel assemblies and as a holddown mechanism to prevent the fuel assemblies 28 from being forced upwardly out of position by the reactor coolant. This is accomplished by the lower extension of the tubes 84 engaging individual holddown plates 35 rigidly connected to the alignment posts 38 of the fuel assemblies 28. A plurality of control element shrouds 88, 90, 92 both for the primary control element assemblies 56, 58 and the fine grain control element assemblies 60 are provided above the upper tube sheet 82 in alignment with the upper extensions of the tubes 84. The control elements 102 and 104 of each of the control element assemblies extend into the hollow tubes 84 and telescopingly move within the control channels formed by the control guide tubes 32 and the hollow alignment posts 38 of the fuel assemblies 28. The protective shrouds 88, 90 for the ganged control element assemblies 56, 58 each enshroud the control element assemblies so as to prevent outward bowing of the control elements 102 which might otherwise interfere with effective insertion of adjacent control element assemblies in the event of an emergency. The shrouds 92 for the fine grain control element assemblies 60 provide the necessary fluid communication with the hydraulic actuator 70 as described above.

In operation, the liquid coolant enters the inlet nozzles 75 and flows downwardly around the outside of the core support barrel 48. The coolant then flows inwardly and up through openings in the lower support structure 46 and in the lower support plate 42. As the coolant flows upwardly through the reactor core 26 it extracts heat generated therein from the nuclear fission in the fuel assemblies 28. The coolant then flows up through openings (not shown) in the lower tube sheet 80 into the outlet plenum 74. The coolant next flows outwardly through openings 168 in the core support barrel and the outlet nozzles 76 to a heat exchanger (not shown) and, in a conventional manner, passes therethrough and back to the inlet nozzels 75. During normal operation, some of the coolant flows upwardly through the tubs 84 into the inactive plenum 78 and back down to the outlet plenum through openings (not shown) in the upper tube sheet 82. This is necessary to maintain cooling of the control elements and provide proper mixing of the water in the inactive plenum, and is not considered to be a part of the primary coolant loop as described above. Essentially, the coolant in the inactive plenum 78 is stagnant relative to the coolant in the outlet plenum 74.

The outlet plenum 74 is necessarily a high cross flow region since the coolant must be turned to pass through the outlet nozzle 76. One of the advantages of the guide structure 72 is that it completely shields the control elements 102, 104 from the adverse effect of this high cross flow in the outlet plenum 74. This is accomplished by the tubes 84 only enshrouding one control element each instead of a plurality of control elements and therefore the tubes 84 may be easily designed to provide the necessary protection. Also, the yoke means 96, 98 which interconnect the elements 102 of the primary control element assemblies 56, 58 always remains above the upper tube sheet 82 whether the elements 102 are fully inserted, fully retracted or in some position in between. Thus, the yoke means 96, 98 need never be subjected to the high cross flow experienced in the outlet plenum 74.

The detailed construction of the upper guide structure 72 can best be seen in referring to FIGS. 3, 5, 6 and 7. It is apparent that the tubes 84 can be rigidly interconnected to the two tube sheets 80, 82 by any well-known means, such as welding. However, the lower tube sheet 80 is normally a highly toleranced machined plate and welding of tubes thereto may distort the plate. Thus, in the preferred embodiment a mechanical joint formed by two concentric tubes 84, 110 has been utilized. It should be understood that only a single tube 84 was illustrated in FIGS. 1 and 2 for the sake of clarity and in order to illustrate the broad concept of the present invention. Referring to FIG. 3, the inner tube is the control element assembly guiding tube 84 and is provided with a flanged lip 112 at its lower end which engages with the lower surface of the lower tube sheet 80. The tube 84 extends upward through the lower tube sheet 80, through the concentric outer tube 110 and through the upper tube sheet 82, terminating a small distance thereabove. The concentric outer tube 110 serves as a spacer for the tube sheets 80, 82 and engages the lower surface of the upper tube sheet 82 and the upper surface of the lower tube sheet 80. The decreased diameter 116 and the increased diameter 117 are provided on the inner surface of the ends of outer tube 110 to provide a tight fit between the outer tube 110 and the inner tube 84. The ends of outer tube 110 form a quasi seal between plates 82 and 80. A plurality of holes 114 are provided in a side wall of the outer concentric tube 110 to prevent air from being trapped in the annular space between the two concentric tubes 84, 110. A nut 118 is threaded from above onto the inner guiding tube 84 and screwed down tightly against the upper tube sheet 82, thereby forcing the inner tubes 84 to be placed in tension and the outer concentric tube 110 to be placed in compression. In this way a rigid construction is formed whereby the lower tube sheet 80 is spaced and supported from the upper tube sheet 82. A lock collar 120 is placed over the nut and crimped into recesses 124 and 126 on the tube 84 and the nut 118, and then tack welded to the upper tube sheet 82 such as shown at 122. This rigidly locks and holds the nut 118 and tubes 84, 110 in place.

Alignment for the alignment posts 38 of all the fuel assemblies 28, even those without control elements 102 or 104, is provided by the tubes 84. The number and pattern of tubes 84 is only dependent upon the number of alignment posts 38 and the pattern of the fuel assemblies 28. In the embodiments shown in the figures, each of the fuel assemblies has four alignment posts and therefore the tubes 84 of the guide structure 72 are arranged in patterns of four. Thus it is apparent that for any particular arrangement of fuel assemblies 28 in the reactor, the guide structure 72 may be manufactured as a standard independent of the control element pattern to be employed. When a control element pattern for the reactor 20 is finally determined, the guide structure 72 may then be completed by simply providing an appropriate protective shroud pattern for enshrouding the control element assemblies.

FIG. 4 shows a representative control pattern for a reactor having 217 fuel assemblies 28 in which four-fingered control element assemblies 56, eight-fingered control element assemblies 58, and fine grain control element assemblies 60 are utilized. The control element pattern in FIG. 4 is only shown for one quadrant of the reactor, the remainder of the control element pattern being symmetric about the two axes 170 and 172. The eight-fingered control element assemblies 58 are arranged relative to the fuel assemblies 28 such that the control elements 102 enter three laterally adjacent fuel assemblies 28, two control elements 102 each telescoping into the control channels of the outer two assemblies 28 and four control elements 102 telescoping into the control channels of the central fuel assembly 28 positioned between the two outer fuel assemblies 28. For the four-fingered control element assemblies 56, each of the control elements 102 telescopes into the guide channels of just one fuel assembly 28. The fine grain control element assemblies 60 are interspersed throughout the reactor core with each control element 104 individually entering into one control channel provided by a guide tube 32. It should be apparent that with use of the guide structure 72 in a reactor it is possible to arrive at a control element pattern wherein all fuel assemblies 28 have control elements therein. Also, greater flexibility of control can be accomplished with a limited number of nozzle penetrations in the vessel head 24 by utilizing a plurality of eight-fingered control element assemblies 58 wherein the control elements 102 enter three fuel assemblies 28 rather than just one fuel assembly as in the prior art.

Another advantage of the guide structure 72 is in removing the control element assemblies 56, 58 and 60 during refueling of the reactor core 26. During refueling, the core 26 is completely flooded with highly concentrated borated water which acts as a poison and neutron absorber so that the control elements 102 and 104 may be completely removed from the fuel assemblies 28 and the reactor will not become critical. After the head has been removed, the upper guide structure 72 may be removed by a lift rig (not shown) with the control element assemblies 56, 58, 60 retained therein as a unit. After the fuel assemblies 28 have been shuffled and/or replaced in the core 26, the guide structure 72 is then repositioned in a similar manner with the retained control element assemblies 56, 58 and 60 providing the same control element pattern as before refueling occurred. This is advantageous in that the normal procedure in refueling is to first remove a fuel assembly 28 with its control element assembly position therein and then switch the control element assembly to the new fuel bundle before it is inserted in the reactor core 26.

Figures 5, 7:
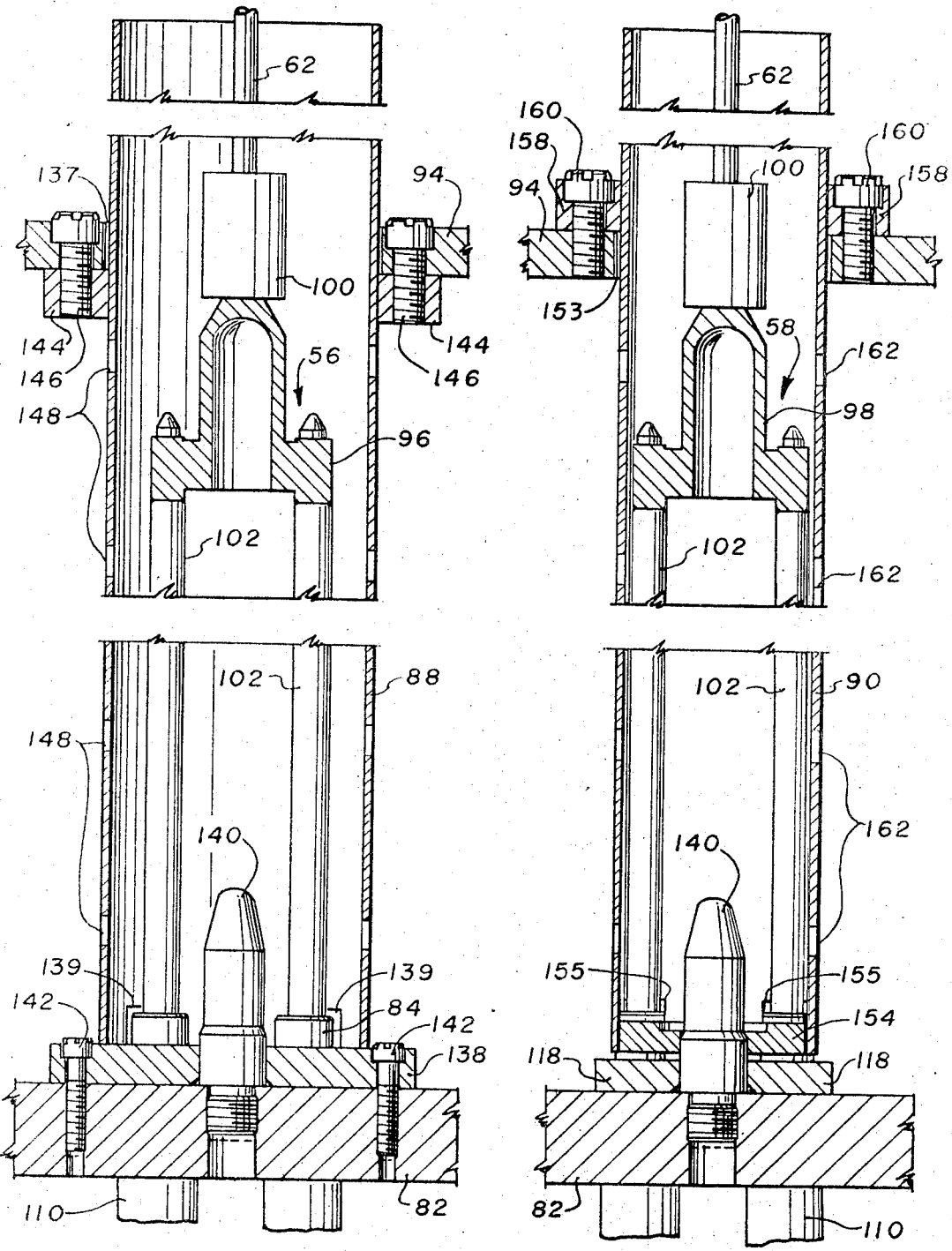
FIG. 5 is a vertical cross sectional view taken along lines 5—5 of FIG. 4 illustrating a four-fingered control element protective shroud employed in the guide structure of FIG. 2.
FIG. 7 is a vertical cross sectional view taken along lines 7—7 of FIG. 4 illustrating an eight-fingered control element protective shroud employed in the guide structure of FIG. 2.

After a control pattern has been selected for a reactor, the guide structure 72 is completed by assembling the control element assembly protective shrouds, 88, 90, 92 thereto. Initially, a selected number of the shrouds are bolted to the top surface of the upper tube sheet 80 to act as a support for the shroud guide plate 94. In the embodiment shown, these shrouds are the four-fingered control element assembly shrouds 88. As seen in FIG. 5, the protective shrouds 88 are cylindrical in shape and each have a base plate 138 which has outwardly extending flanges 137 which are bolted to the top of the upper tube sheet 80 by bolts 142. The base plate 138 has a plurality of openings (not shown) therethrough for receiving the control element guide pin 140 and the upper ends of the tubes 84. Cutouts 139 in the side wall of the shroud 88 provide clearance for the tubes 84 within the shroud 88 above the base plate 138. The guide pin 140 is secured to the top of the upper tube sheet 82 and serves to align the shroud 88 and also the yoke means 96 of the control element assembly 56 when the control rods are fully inserted. The protective shrouds 88 are provided with a plurality of flow openings 148 in the side thereof which allows coolant which comes up through the tubes 84 to exit into the inactive plenum 78. After a plurality of four-fingered control element assembly shrouds 88 are secured to the top tube sheet 82, the shroud guide plate 94 is lowered over the shrouds 88 and rests on flanges 144 extending outward from the shroud 88. The plate 94 is held in place by bolts 146.

Next, the fine grain control element shrouds 92 (see FIG. 6) are inserted through appropriate openings 129 in the shroud guide plate 94 and threaded onto the upper portion of the tubes 84 extending upward through the upper tube sheet 82. An O-ring or equivalent seal 130 is provided at the coupling joint so as to prevent fluid leakage therethrough. A nut 132 is threaded from above onto the upper end of the fine grain control element shroud 92 and tightly threaded down until the outwardly extending flanges 133 on the nut 132 engage the upper surface of the shroud guide plate 94, thereby rigidly supporting the upper end of the fine grain control element shrouds 92. The nut 132 is then tack welded to the shroud 92 as at 134 to hold it in place.

Finally, the eight-fingered control element protective shrouds 90 (see FIG. 7) are lowered through appropriate openings 153 in the shroud guide plate 94. The eight-fingered control element shrouds 90 each have a lower base plate 154 integrally attached thereto and a plurality of openings (not shown) similar to those for the four-fingered control element protective shrouds 88 for receiving the guide pin 140 and the upper ends of the tubes 84. Cutouts 156 in the side of the shroud 90 provide clearance above the base plate 154 for the tubes 84. The shrouds 90 rest on the shroud guide plate 94 by means of flanges 158 extending outward from the sides of the shrouds 90. The flanges 158 are bolted to the plate 94 by bolts 160. As with the four-fingered control element shrouds 88, a plurality of holes 162 are provided in the side wall of the shroud 90 to allow coolant to exit therefrom. The lower end of the eight-fingered control element shroud 90 is spaced from the upper tube sheet 82 and held in alignment merely by a tight fit between the upper ends of the tubes 84 and the openings in the lower base plate 154.

Each of the nuts and bolts may then be tack welded or otherwise locked in place so as to prevent loosening thereof during operation of the reactor. The above described procedure of assembly of the shrouds 88, 90, 92 to the guide structure 72 is necessitated by the fact that there is a limited work space in the inactive plenum 78.

Figure 8:
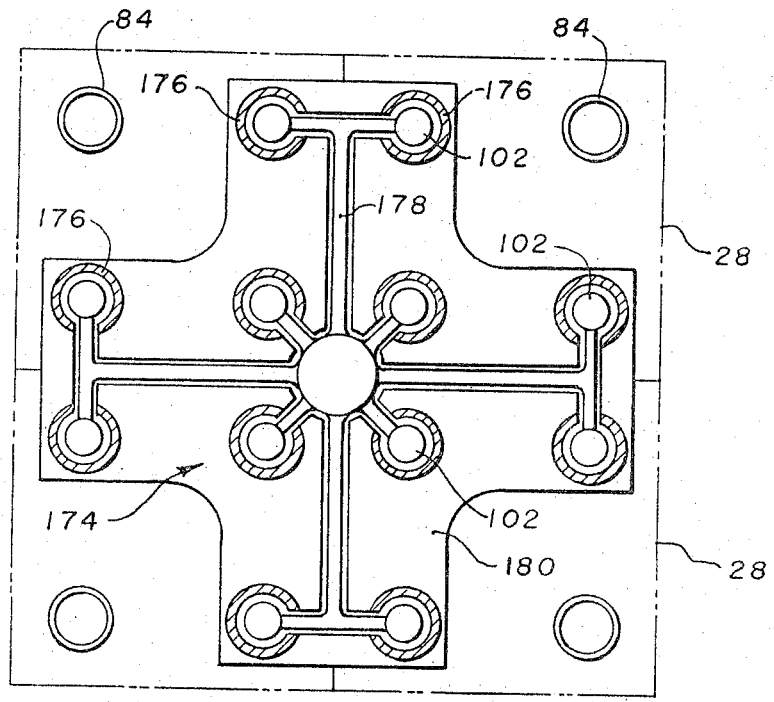
FIG. 8 is a horizontal cross sectional view of an alternative control element assembly and protective guide means.
Figure 9:
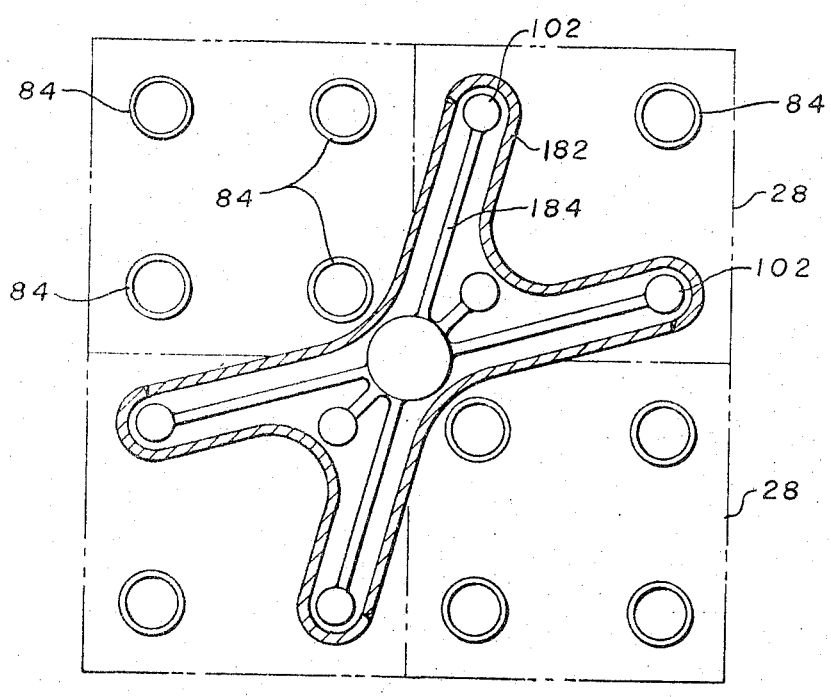
FIG. 9 is a horizontal cross sectional view of another alternative control element assembly and protective guide means.

Several alternative control schemes are shown in FIGS. 8 and 9 for ganged control element assemblies which go to show the great flexibility of control which is possible with the guide structure 72. FIG. 8 shows a 12-fingered control element assembly 174 whose control elements 102 are adapted to enter the guide channels in four fuel assemblies 28. FIG. 8 also shows an alternative scheme for guiding and protecting the control elements 102 above the upper tube sheet 82 from interference of other control element assemblies. Instead of having shrouds, a plurality of split tubes 176 are provided with each having a longitudinal slot extending the length thereof. The split tubes 176 may be affixed to the guide structure in a similar manner as the fine grain control element shrouds 92. The longitudinal slots are arranged so as to accommodate extensions on the 12-fingered yoke 178 of the control element assembly 174 during the vertical travel thereof in the inactive plenum 78. A plurality of support plates 180 are shown which provide lateral support for the split tubes 176.

FIG. 9 shows a six-fingered control element assembly 182 whose yoke 184 is shaped in the form of a "crow's" foot. The control elements 102 connected to the yoke 184 enter two diagonally spaced fuel assemblies 28. A six-fingered control element shroud 186 is affixed to the guide structure 72 in a similar manner as the shrouds for the preferred embodiment and serves as a guide and protection means for the control elements 102 above the upper tube sheet 82.

It should be apparent from the preferred embodiment and the alternative embodiments that virtually any type of control element pattern in which some of the control elements are interconnected to a common yoke can be utilized with this type of upper guide structure. The major feature of the guide structure 72 which accommodates this is that the yoke need never pass into the high cross-flow and turbulent region of the outlet plenum 74 in the reactor vessel 22. By substantially isolating the plenum 78 in which the control element yoke travels from the main coolant path of the reactor it is not necessary to provide massive and heavy shrouding to protect the yoke. Instead, relatively inexpensive or no shrouding may be used to guide the yoke and control elements in the inactive plenum 78 and standardized tubing may be used for each of the individual control element fingers which pass through the outlet plenum 74. It should however be understood that the protective guidance shrouding above the upper tube sheet 82 may not be necessary at all. The function the shrouding serves is that of insuring that the control element assemblies will not interfere with one another during insertion into the nuclear core 26. If it can be shown that the elements 102 will not bow outward if they become stuck in the withdrawn position, then the protective shrouding is not necessary.

One of the major advantages in using the guide structure 72 deals with capability of providing a new and novel emergency core cooling system. In the event that the normal cooling is lost or decreased through a break in the reactor coolant system, it is necessary to provide a sufficient coolant flow through the core 26 in order to remove the decay heat which is still being generated in the fuel despite the insertion of the control elements 102 and 104 thereinto. Otherwise the fuel may overheat and result in fuel cladding failure and release of radioactive containments to the atmosphere. Normally, in the case of such an accident, emergency core coolant water is pumped in through the inlet nozzles 75 and allowed to flow down through the annulus between the core barrel 48 and the vessel 22 as occurs during normal operation. As is apparent, there is necessarily a time delay between the startup of the emergency core coolant system and the water reaching the core 26. As the water begins to fill in the core 26, steam is created which exits through the outlet nozzles 76 as in normal operation of the reactor. In such a situation it has been postulated that due to the great amount of steam created, steam blockage may occur and thereby reduce the effectiveness of the emergency core coolant system in removing decay heat.

With the guide structure 72 as previously described, it is possible in the event of an accident to provide either an alternative emergency core coolant system or an additional core coolant system which may be used in conjunction wth the prior art systems. FIG. 1 shows generally the concept wherein emergency core coolant water is stored in a tank 188 positioned outside of the reactor vessel 22 and which communicates with the inactive plenum region 78 by means of piping 190 passing through the side wall of the reactor vessel 22 and the side walls of the core barrel 48 and upper guide structure 72. A valve means 192 is provided in the piping 190 which is actuated in the event of an accident to allow the coolant water in the tank 188 to be passed into the inactive plenum 78 of the reactor 20. The valve means 192 may be one of any of the well-known types which are used in actuation of the prior art emergency core coolant systems. Generally it comprises at least two valves for redundancy in accordance with standard emergency core coolant procedures. Although only one tank means 188 is shown in FIG. 1, it is apparent that a plurality of tanks 188 and corresponding piping or conduits 190 may be provided for redundancy and additional safety.

Figure 11:
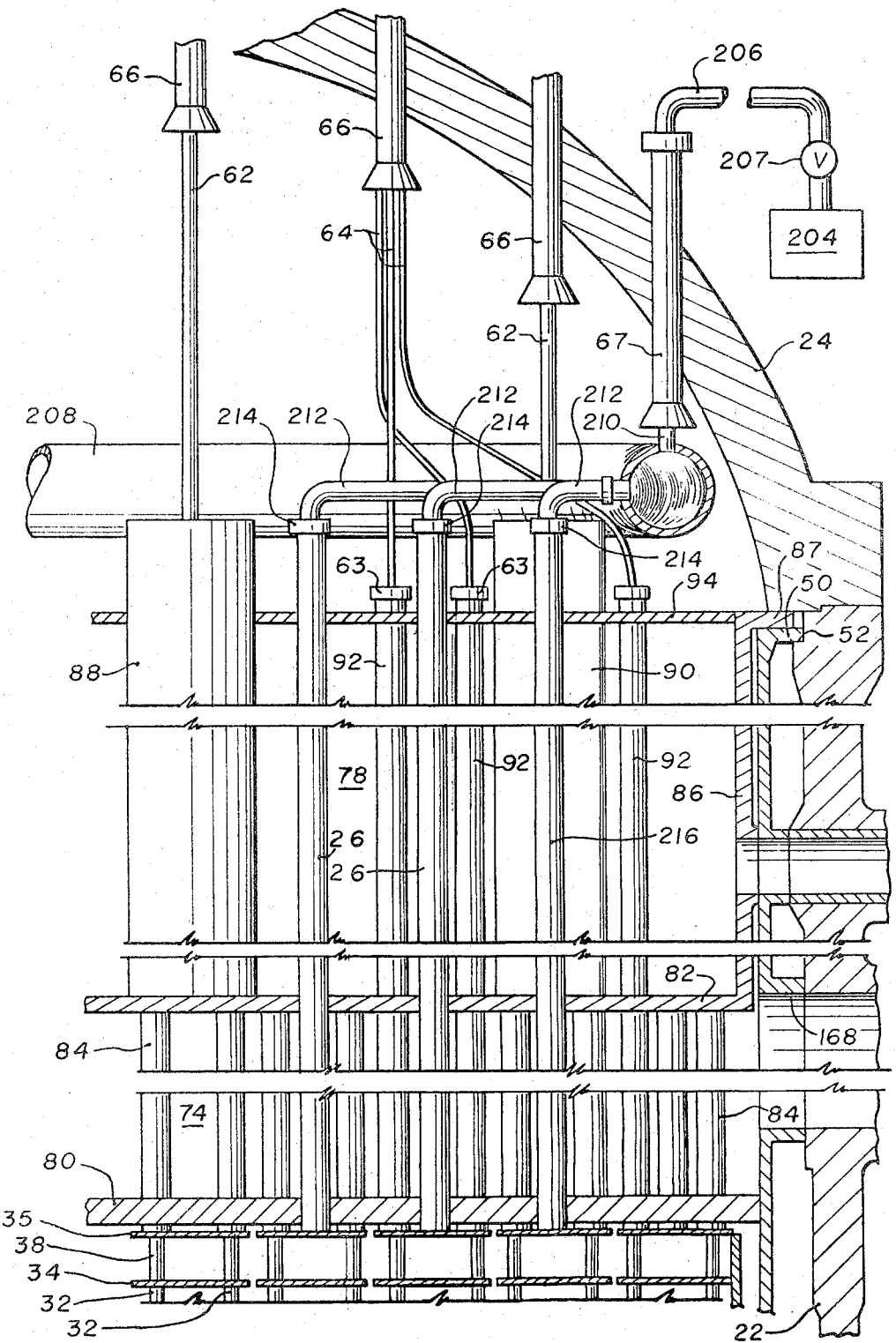
FIG. 11 is an elevation view partially in section illustrating another alternative arrangement of the guide structure employed to distribute emergency core coolant to the core of the reactor.

It should be noted that a variety of alternatives are available for introducing the coolant fluid into the inactive plenum 78, all of which may offer additional advantages. For instance, communication to the inactive plenum 78 could just as easily be provided through the vessel head 24 such as through a nozzle 67 as shown in FIG. 11 instead of through the side wall of the vessel 22. This would be advantageous for reactors presently in operation. Alternatively, a spray ring header with spray nozzles could be utilized, which act as a better condensing medium for steam in the inactive plenum. If steam can be condensed in the inactive plenum, the pressure therein will be lowered. This in turn will act to pull coolant from an inlet nozzle injection system up through the core 26. Additionally, the emergency core coolant system could be provided with a pumping system for introducing more coolant fluid into the tank means 188 to continue cooling water flow. This is particularly advantageous in the event there is a break in the bottom of the reactor vessel 22 in which case it would be impossible to fill the core 26. Instead the additional coolant to the tank 188 would provide sufficient cooling of the core 26 till the decay heat has been removed.

Figure 10:
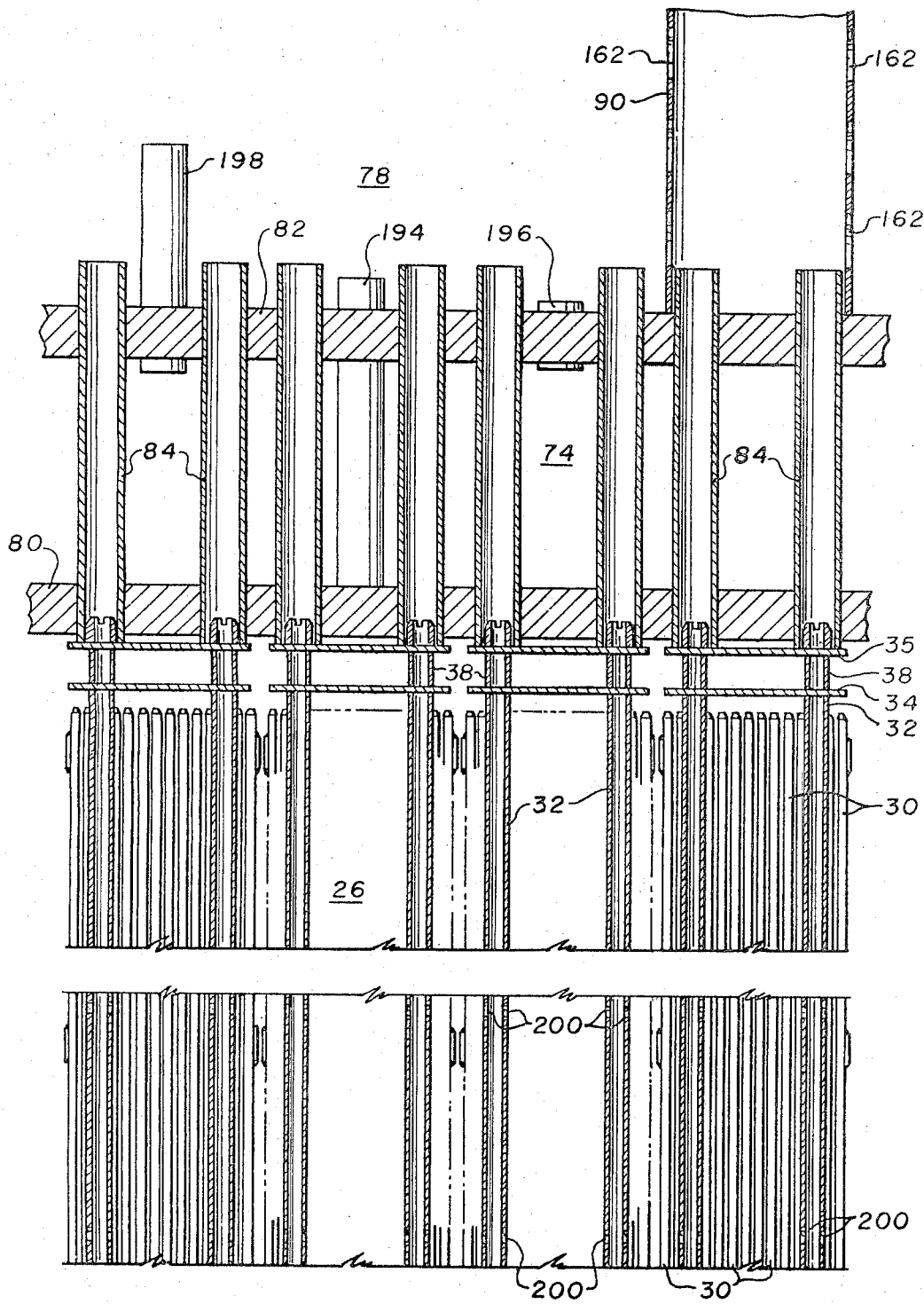
FIG. 10 is a vertical cross sectional view of an alternative arrangement of the guide structure employed to distribute emergency core coolant to the core of the reactor.

As the coolant is introduced in the inactive plenum 78, it flows downward by gravity onto the upper tube sheet 82 of the upper guide structure 72. The guide structure 72 is provided with the capability of allowing three types of cooling. As shown in FIG. 10, apertures or pipes 196 allow a portion of the emergency core coolant to pass from the inactive plenum 78 into the condensing plenum 74 to outlet in condensing some of the steam which is passed into the outlet plenum 74. The condensed steam will then fall back as water into the core region 26 to aid in cooling the fuel and in refilling the core 26 so that it will be completely submersed in coolant. Secondly, piping or tubes 194 provide direct communication or flow coupling between the inactive plenum 78 and the core region 26, thereby bypassing the outlet plenum 74. In FIG. 10, the tubes 194 are similar to the tubes 84 and are positioned centrally over a fuel assembly 28 so as not to interfere with the alignment of the fuel assembly alignment posts 38 and tubes 84. The coolant which flows down these tubes 194 sprays directly onto the fuel assemblies 28 which thereby greatly increases the heat removal therefrom. This spray system is particularly advantageous in that with normal emergency core coolant systems, the coolant may not quickly reach the upper fuel region of the core 26 due to possible steam blockage and the relatively long delay time after the occurrence of an accident. Finally, cooling is possible through the tubes 84 which serve to align the alignment posts 38 of fuel assemblies 28 and which provide guidance for the control element assemblies 56, 58, 60. Since each of the alignment posts 38 and the guide tubes 32 of the fuel assemblies 28 are hollow to allow for insertion of control elements 102 and 104, emergency core coolant may be introduced into the hollow channels through the tubes 84 and flow downward to the lower region of the core 26. In this way the emergency core coolant water bypasses the outlet plenum 74 and a substantial portion of the core region 26. The cooling of the fuel occurs indirectly as the guide tubes are cooled. At least one hole 200 is provided in each guide tube 32 in the lower region of the core 26 to allow coolant to be introduced into the lower portion of the core 26. Additionally, other holes 200 may be introduced along the longitudinal length of the guide tubes 32 to allow for the introduction of more coolant into the core to directly cool the core 26 and to aid in refueling. This is particularly advantageous since steam formation in the core will not adversely affect the flow of the coolant.

Also shown in FIG. 10 is a means for relieving steam in the outlet plenum 74. The upper tube sheet is provided with stand pipes 198 which flow couple the outlet plenum 74 and the inactive plenum 78 to allow steam in the outlet plenum 74 to be released into the inactive plenum 78 where it may be condensed by the emergency coolant water being introduced thereinto.

An additional advantage of the emergency core coolant system is that the sequence of cooling operations may be varied simply by varying the elevations of the flow coupling tubing above the upper tube sheet 82. As the coolant is introduced into the inactive plenum 74, the elevation of the coolant above the tube sheet 82 increases. The sequence of cooling operation occurs in the order of the elevations of the flow coupling tubing above the tube sheet 82, the operation having its tubing positioned closest to the tube sheet 82 occurring first. Initially, it is postulated that the preferred sequence of operations would be as shown in FIG. 10. Emergency core coolant is first introduced into the outlet plenum 74 through tubes 196, then into tubes 194 to spray the top of the core 26 and finally into tubes 84 to indirectly cool the core 26. Thus the elevation of the tubing is such that the top of the tubes 196 are closest to the top surface of the upper tube sheet 82, the tubes 194 are second closest and the tubes 84 are third closest. The steam relief stand pipes 198 have their tops located furthest from the top surface of the upper tube sheet so as to be able to relieve the most steam from the outlet plenum 74. As can be seen in FIGS. 6, 7 and 10 each of the shrouds for the ganged control element assemblies (only shroud 90 for the eight-fingered control element assembly 58 is shown in FIG. 10) are provided with holes 148, 162 in the side walls thereof to allow emergency core coolant water to enter the shrouds 88, 90 and the tubes 84 positioned therein which provide alignment for the alignment posts 38 of the fuel assemblies 28 having control elements 102 therein. Obviously the elevation of these holes may be varied to facilitate any desired sequence of cooling operations.

Although only one sequence of cooling operations has been depicted in FIG. 10, it should be evident that the elevations of the tubing may readily be changed in order to produce a different sequence of cooling operations which may prove to be more advantageous in cooling the core 26.

FIG. 11 shows an alternative scheme for introducing emergency core coolant water into the core region 26. This embodiment may be utilized in conjunction with the prior art systems and/or the system described in FIG. 10. For the alternative embodiment, a plurality of tubes 216 are provided which pass through the two tube sheets 80, 82 and the shroud guide plate 94 of the guide structure 72. The tubes 216 communicate with the core region 26 at one end and are coupled to a header 208 at the other end through piping 212 and couples 214. The header 208 has piping 210 which passes through a nozzle 67 in the vessel head 24 and connects to piping 206 outside of the reactor vessel 22. The piping 206 communicates with a tank means 204 having a pressurizing means therein for pressurizing emergency core coolant water. A valve means 207, situated in piping 206, is actuatable in the event of an accident to introduce the pressurized coolant into the header 208. The pressurized coolant then flows from the header 208 into the tubes 216 to pressurize spray the core region 26.

The fact that the coolant is pressurized allows the system to overcome any possible steam blockage problems which might occur in the upper region of the core 26 and insures that the fuel assemblies 28 will be cooled. This is advantageous since otherwise, if steam blockage does occur, the gravity head of the emergency core coolant may not be sufficient to allow introduction of coolant into the core region 26. Furthermore, with pressurized coolant the problem of steam relief is lessened. By introducing coolant fluid into the reactor vessel 22 at a pressure higher than the steam, the steam will simply be forced out of the reactor through the outlet nozzles 76. As with the embodiment depicted in FIG. 10, redundancy and additional safety may be insured by providing additional tanks and pressurizers 204 and piping 206 which communicate with the header 208. Also a plurality of headers 208 could be provided. Further still, additional or alternative piping from the header 208 could be utilized to provide the cooling operations depicted in FIG. 10.

While preferred embodiments of the invention have been shown and described, it will be understood that these are merely illustrative rather than restrictive and that changes may be made without departing from the invention as claimed.

What is claimed is:

1. A nuclear reactor comprising, in combination:
   a vessel having a nuclear core fixedly positioned therein;
   a plurality of fuel assemblies comprising said nuclear core, each of said fuel assemblies having a plurality of longitudinally extending fuel elements and a plurality of longitudinally extending guide channels;
   an upper plate and lower plate in said vessel, said lower plate overlying all of said plurality of fuel assemblies and said upper plate being spaced above said lower plate;
   a plurality of hollow tubes extending between and rigidly connected to said upper plate and said lower plate, the wall of each of said hollow tubes being circumferentially continuous substantially over the length thereof, and each of said hollow tubes being in alignment with only one of said guide channels;
   a support means for supporting said two spaced plates in said vessel;
   a plurality of control elements each of which is situated for telescoping movement within only one of said hollow tubes and said channel in alignment therewith;
   a plurality of yoke means each of which is wholly within said vessel and which interconnects at least two of said plurality of control elements, each of said yoke means having a plurality of laterally extending fingers each of which overlies and is in alignment with one of said hollow tubes and which is connected to said control element situated therein;
   connection means for each of said yoke means connected to said yoke means inside said vessel and passing outside of said vessel, each of said interconnected connection means, yoke means and control elements forming a rigid and essentially nonflexible unitary structure; and drive means positioned outside of said vessel for each of said connection means, each of said drive means being connected to one of said connection means for driving said control elements connected thereto between a fully inserted position and a fully retracted position to control the reactivity of said nuclear core during normal operation, the position of each of said yoke means for both of said control element positions being vertically above both of said upper and lower plates.

2. The combination of claim 1 further including a plurality of protective guidance means above said upper plate, each of said protective guidance means guiding said control elements interconnected to one of said yoke means so as to prevent interference between said control elements interconnected to said one of said yoke means and the other of said control elements and said yoke means.

3. The combination of claim 2 wherein said protective guidance means are shrouds each of which enshrouds one of said yoke means and said control elements interconnected thereto.

4. The combination of claim 3 wherein said shrouds each have flow openings on the side walls thereof.

5. The combination of claim 2 wherein said protective guidance means are a plurality of longitudinally extending split tubes, each of said split tubes having a longitudinal slot along the length thereof to allow passage of said laterally extending finger connected to said control element for which said tube is providing guidance during vertical travel of said finger.

6. The combination of claim 1 wherein said fuel assemblies each have alignment means, and wherein each of said alignment means has one end in registry with one of said channels of said fuel assemblies and has its other end received within and positioned by one of said hollow tubes.

7. The combination of claim 6 wherein:
said reactor vessel includes a lip;
said support means includes a cylindrical barrel integral with one of said upper and lower plates; and
said barrel includes outwardly extending flanges which rest on said lip of said reactor vessel.

8. The combination of claim 1 wherein at least one of said yoke means has laterally extending fingers which are connected to a plurality of said control elements which telescopingly move into said channels of a plurality of said fuel assemblies.

9. The combination of claim 7 wherein each of said hollow tubes extends between and through each of said upper and lower plates one end of each of said hollow tubes having flanges engaging one of said upper and lower plates and the other end being threaded; and wherein there is provided a nut and an outer concentric tube for each of said hollow tubes, each of said outer concentric tubes being positioned around one of said hollow tubes and between said upper and lower plates and each of said nuts being threaded onto said threaded end of said hollow tubes whereby each of said hollow tubes is placed in tension and each of said outer concentric tubes is placed in compression.

10. The combination of claim 8 wherein at least one of said control elements of said plurality is free for individual telescoping movement within one of said hollow tubes and said channel in alignment therewith independent of the remainder of said control elements.

11. The combination of claim 10 wherein said one yoke means interconnects a plurality of said control elements which telescopingly move into said channels of two of said fuel assemblies.

12. The combination of claim 10 wherein said one yoke means interconnects a plurality of said control elements which telescopingly move into said channels of three of said fuel assemblies.

13. The combination of claim 10 wherein said one yoke means interconnects a plurality of said control elements which telescopingly move into said channels of four of said fuel assemblies.

* * * * *